_United States Patent_ [19]
Hartke et al.

[11] 3,976,593
[45] Aug. 24, 1976

[54] AMINE BISULFITES
[75] Inventors: Francis J. Hartke, Bridgeton; James E. Davis, Affton, both of Mo.
[73] Assignee: Petrolite Corporation, St. Louis, Mo.
[22] Filed: May 19, 1975
[21] Appl. No.: 578,369

[52] U.S. Cl. ............................. 252/391; 21/2.7 R; 252/395; 260/247.1 R; 260/247.1 E
[51] Int. Cl.$^2$ ..................... C09K 3/00; C23F 9/00; C07D 295/00
[58] Field of Search ............ 252/391, 395; 21/2.7 R; 260/247.1 R, 247.1 E

[56] References Cited
UNITED STATES PATENTS

| | | | |
|---|---|---|---|
| 3,119,447 | 1/1964 | Raifsnider | 166/1 |
| 3,121,091 | 2/1964 | Green | 252/391 |
| 3,422,022 | 1/1969 | Richards | 252/391 |
| 3,507,670 | 4/1970 | Raifsnider | 252/391 |
| 3,625,888 | 12/1971 | Redmore | 21/2.7 R |

OTHER PUBLICATIONS

Morrison, "Organic Chemistry", Allyn & Bacon Inc. June 1964, p. 553.

_Primary Examiner_—Samuel W. Engle
_Assistant Examiner_—Donald P. Walsh
_Attorney, Agent, or Firm_—Sidney B. Ring; Hyman F. Glass

[57] ABSTRACT

This invention relates to the amine bisulfites which are useful as a combination corrosion inhibitor/oxygen scavenger. This is illustrated by heterocyclic amine bisulfites such as pyridine bisulfites.

16 Claims, No Drawings

AMINE BISULFITES

The presence of air or oxygen increases the corrosiveness of a system, for example, drilling fluids or air drilling systems used in drilling oil and gas wells, brines employed in the secondary recovery of petroleum by water flooding and in the disposal of waster water and brines from oil and gas wells, steam generating systems, water circulating systems, automobile radiators, diesel locomotive engines, boiler water, sea water ship ballast, etc.; in fact, in any system where oxygen or air is present, its presence causes or increases corrosion. Therefore it is highly desirable to remove oxygen from such systems. The practice of removing dissolved oxygen from such systems is so well known that the agent employed to achieve this result is known as oxygen scavenger.

Where corrosion inhibitor/oxygen scavenger systems have heretofore been employed, the oxygen scavenger usually is blended with the corrosion inhibitor, each separately performing its function.

We have now discovered bisulfites of corrosion inhibiting amines function as both corrosion inhibitor and oxygen scavenger.

Such corrosion inhibiting amines include aliphatic, cycloaliphatic, aromatic, heterocyclic, etc., amines. Preferably these amines contain tertiary amine groups.

In addition, most blended corrosion inhibitor/oxygen scavenger systems are ineffective as scavengers because the presence of the corrosion inhibitor often interferes with the oxygen scavenging reaction.

We have also discovered when bisulfite salts of amines of this invention are employed, the presence of the amine does not inhibit its oxygen scavenging function. Although it is well known that cobalt is an excellent catalyst for the oxygen scavenger system such as ammonium bisulfite, it cannot be used because it results in the formation of insoluble product. We have also discovered that this insolubilization does not occur with the amine bisulfite products of this invention.

These compounds are not only effective as oxygen scavengers, they are also effective as corrosion inhibitors.

These compounds are particularly effective in the prevention of corrosion in systems containing a corrosive aqueous medium, and most particularly in systems containing brines.

These compounds can be used in the prevention of corrosion in the secondary recovery of petroleum by water flooding and in the disposal of waste water and brine from oil and gas wells. Still more particularly, they can be used in a process of preventing corrosion in water flooding and in the disposal of waste water and brine from oil and gas wells which is characterized by injecting into an underground formation an aqueous solution containing minor amounts of the compositions of this invention, in sufficient amounts to prevent the corrosion of metals employed in such operation.

Water flood waste disposal operations are too well known to require further elaboration. In essence, the flooding operation is effected in the conventional manner except that the flooding medium contains a minor amount of these compounds, sufficient to prevent corrosion.

While the flooding medium employed in accordance with the present invention contains water or oil field brine and the compounds of this invention, the medium may also contain other materials. For example, the flooding medium may also contain other agents such as surface active agents or detergents which aid in wetting throughout the system and also promote the desorption of residual oil from the formation, sequestering agents which prevent the deposition of calcium and/or magnesium compounds in the interstices of the formation, bactericides which prevent the formation from becoming plugged through bacterial growth, tracers, etc. Similarly, they may be employed in conjunction with any of the operating techniques commonly employed in water flooding and water disposal processes, for example five spot flooding, peripheral flooding, etc. and in conjuction with other secondary recovery methods.

The concentration of the compounds of this invention will vary widely depending on the particular compound, the particular system, etc. Concentrations of at least about 1 p.p.m., such as about 1 to 7,500 p.p.m., for example about 1 to 5,000 p.p.m., advantageously about 10 to 1,000 p.p.m., but preferably about 25–250 p.p.m. may be employed. Larger amounts can also be employed such as 1.5–5.0% although there is generally no commercial advantage in so doing.

For example, since the success of a water flooding operation manifestly depends upon its total cost being less than the value of the additional oil recovered from the oil reservoir, it is quite important to use as little as possible of these compounds consistent with optimum corrosion inhibition. Since these compounds are themselves inexpensive and are used in low concentrations, they enhance the success of a flood operation by lowering the cost thereof.

The following are non-limiting examples of heterocyclic amines:

Lower monoalkyl, preferably ($C_1$ and $C_2$) 2-substituted pyridines, such as 2-picoline and 2-ethylpyridine Lower dialkyl, preferably ($C_1$ and $C_2$), 2,3, 2,4; and 2,5-substituted pyridines, such as 2,4-lutidine, 2,5-lutidine, 2,6-lutidine, 2-methyl-3-ethylpyridine, 2-methyl-4-ethylpyridine, 2-ethyl-3-methylpyridine, 2-ethyl-4-methylpyridine, and 2-ethyl-5-methylpyridine Lower trialkylpyridines having either the 2 or 6 positions (but not both) open, such as 2,3,5-trimethylpyridine, and 2,3,5-triethylpyridine Polynuclear heterocyclic nitrogen compounds, such as quinoline, isoquinoline, benzoquinolene, phenanthridine and acridine, and alkyl substituted derivatives thereof.

Many of the commercially available nitrogen compounds suitable for preparing the corrosion inhibitors of this invention are mixtures of the above-described materials. These materials are available from the following companies under the following names.

Reilly Tar and Chemical Co.:
LAP
HAP

Allied Chemical Company:
Tar Base
Inhibitor Base
Quinoline Residue

Koppers Company:
15–18 grade base
16–20 grade base
Wet sprung high boiling base

The name "LAP" above refers to low-boiling alkylpyridines, having the following properties:

| | |
|---|---|
| Distillation range at 760 mm., 5–95%, °C. | 172–183 |
| Density at 20°C. g/ml | 0.924 |
| Neutral oil, percent | 3.2 |
| Approximate equivalent weight | 130 |

The name "HAP" above refers to high-boiling alkyl-pyridines, having the following properties: Distillation range at 760 mm.:

| | °C. |
|---|---|
| 2% | 204 |
| 5 | 207 |
| 10 | 211 |
| 20 | 218 |
| 50 | 256 |
| 70 | 323 |
| 80 | 361 |

Decomposition after 80% distilled:

| | |
|---|---|
| Density at 20°C. g/ml | 1.003 |
| Neutral oil, percent | 8.6 |
| Approximate equivalent weight | 200 |

The name "Alkyl Pyridine R" (APR) of Union Carbide Company refers to a mixture of high boiling alkyl-pyridines with an equivalent weight of about 170.

The amine bisulfites are prepared by suitable means. Since they are bisulfite salts, they can be prepared by reacting the amines with $H_2SO_3$ or its equivalent. For example, sulfurous acid ($H_2SO_3$) can be prepared in situ by dissolving $SO_2$ in water.

$$H_2O + SO_2 \rightarrow H_2SO_3$$

The salts are prepared by reacting one equivalent of amine with one equivalent $H_2SO_3$ or $SO_2$ according to the equation

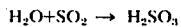

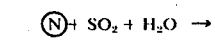

specifically with 2-methyl-5-ethyl pyridine (MEP)

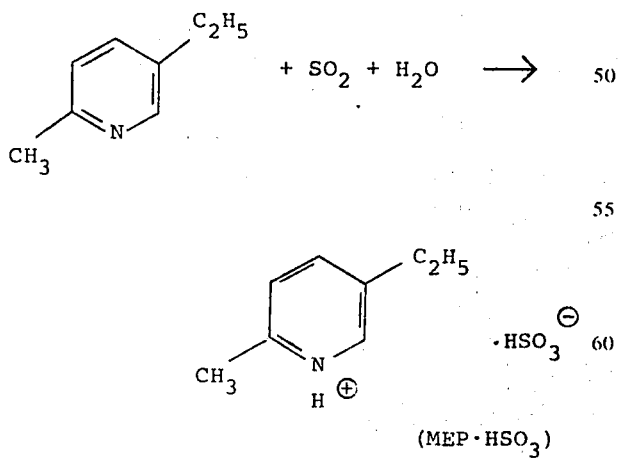

Aliphatic amine is illustrated by triethanol amine.

Other heterocyclic amines are illustrated by morpholine amines such as those contained in Amine C-6 (Jefferson Chemical).

Amine C-6 obtained as a co-product from a commercial continuous operation, is a clear, darkamber liquid composed primarily of a mixture of aliphatic and heterocyclic mono- and diamines. The morpholinyl ring is the dominant heterocyclic group present, and the oxyethylene linkage appears very frequently in the various compounds present. Amine C-6 is completely miscible with water.

Amine C-6 was subjected to a fractional distillation analysis. The fractions were then analyzed by a combination of vapor chromatographic analysis, titration analysis, functional group analysis, and infrared. Undoubtedly, the three major compounds typically present are:

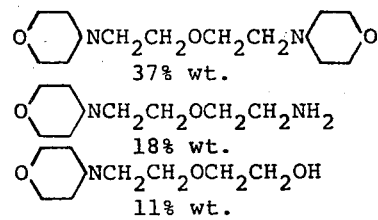

1. bis-2-(4-morpholinyl) ethyl ether
2. 4-(2-aminoethoxy) ethylmorpholine
3. 2-(4-morpholinylethoxy) ethanol These constituents represent approximately 65% wt. of the Amine C-6. Other amines which have been identified as present in small quantities are:

bis-(2-aminoethyl) ether
4-(2-aminoethyl) morpholine
2-(2-aminoethoxy) ethanol
dimorpholinoethane The following examples are presented for purposes of illustration and not of limitation.

EXAMPLE 1

| | |
|---|---|
| MEP | 38.29% |
| $H_2O$ | 13.90 |
| Isopropanol | 27.81 |
| $SO_2$ | 20.00 |

$MEP.HSO_3$ was prepared by adding $SO_2$ to the aqueous isopropanol solution of MEP.

EXAMPLE 2

| | | |
|---|---|---|
| I | Amine C-6 | 47.00 |
| | $H_2O$ | 15.62 |
| | Isopropanol | 9.56 |
| | $SO_2$ | 20.00 |
| added to 1 | $H_2O$ | 7.82 |
| | $CoCl_2$ | 1.0 |

The Amines $C-6.HSO_3$ was prepared by adding $SO_2$ to the isopropanol solution of Amine C-6.

$CoCl_2$ was added to the formulation by dissolving in water and then adding this solution to the final product.

EXAMPLE 3

| | |
|---|---|
| Picoline | 29.06 |
| $H_2O$ | 15.62 |
| Isopropanol | 35.32 |
| $SO_2$ | 20.00 |

Picoline·HSO₃ was prepared by adding SO₂ to the aqueous isopropanol solution of Picoline.

EXAMPLE 4

| | |
|---|---|
| NH₄OH | 8.26 |
| MEP | 28.40 |
| H₂O | 8.22 |
| Isopropanol | 25.12 |
| SO₂ | 30.00 |

The HSO₃ salt was prepared by adding SO₂ to the aqueous isopropanol solution of NH₄OH/MEP.

A 1% solution of CoCl₂ was added to the final product.

EXAMPLE 5

| | |
|---|---|
| Triethanol amino (TEA) | 45.53 |
| H₂O | 22.99 |
| Isopropanol | 11.48 |
| SO₂ | 20.00 |

TEA · HSO₄ was prepared by adding SO₂ to the aqueous isopropanol solution of TEA.

A 1% CoCl₂ solution was added to the final product.

The following tests were run to illustrate the effectiveness of the compounds of this invention. The oxygen scavenger tests were run as follows:

The test apparatus consists of an oxygen meter, 1000 ml flask, 5% synthetic sea water, stopwatch, and micro syringe.

The flask is filled with sea water, and corked. The oxygen probe is inserted through the cork and fluids are stirred with magnetic stirrer.

PPM $O_2$ reading, temperature reading, and pH are taken prior to scavenging. Compound is added at a ratio of 20 ppm compound: 1 ppm $O_2$. The time necessary to reach about 0 ppm $O_2$ is taken on stopwatch.

TABLE I

Oxygen Scavenger Tests

The results as tested at pH8 and temperature of about 20°C. are as follows:

| | | Elapsed time in seconds | | | | | |
|---|---|---|---|---|---|---|---|
| | | 0 | 60 | 90 | 120 | 150 | 180 |
| Ex. 1 | MEP product | 8.5 | 1.25 | 0.5 | 0.30 | 0.25 | ~0 |
| Ex. 2 | Amine C-6 product | 9 | 0.75 | 0.5 | 0.25 | 0.20 | ~0 |
| Ex. 3 | Picoline product | 8.7 | 0.50 | 0.35 | 0.25 | 0.20 | ~0 |
| Ex. 4 | NH₄OH+MEP product | 8.5 | 1.00 | 0.25 | 0.35 | 0.25 | ~0.2 |
| Ex. 5 | TEA product | 9 | 2.00 | 1.0 | 0.50 | 0.4 | ~0.25 |

CORROSION TESTS

These tests were run under conditions so set up as to simulate those found in an actual producing well. The test procedure involved the measurement of the corrosive action of fluids inhibited by the compositions herein described upon sandblasted SAE 1020 steel coupons measuring ¼ inch in diameter and being 4 inches long when compared to test coupons containing no inhibitor and commercial inhibitors.

Clean pint bottles were half-filled (almost 200 ml.) with seawater (i.e. tap water containing 3% by weight of the salts, magnesium chloride, calcium chloride, sodium sulfate and sodium chloride) which had been saturated with hydrogen sulfide. Those requiring inhibitor were charged with the same by pipetting calculated amounts contained in suitable solvents (water, isopropyl alcohol, mineral spirits) to give the required parts per million of inhibitor. Uninhibited blanks were run in conjunction with inhibited solutions. The bottles were now filled (total volume now about 400 ml.) leaving a small air space to allow for expansion. The weighed coupons attached to sealing caps were screwed onto the bottles and they were placed on a rotating wheel. The coupons were then removed, cleaned electrolytically in 5% sulfuric acid (using the coupons as a cathode) and washed successively with dilute sodium hydroxide, twice with water, once with acetone and finally dried.

The changes in the weights of the coupons during the corrosion test were taken as a measurement of the effectiveness of the inhibitor compositions. Protective percentage was calculated for each test coupon taken from the inhibited fluids in accordance with the following formula:

$$\frac{W_1 - W_2}{W_1} \times 100 = \text{percent protection}$$

in which $W_1$ is the loss in weight of the coupon taken from uninhibited fluids and $W_2$ is the loss in weight of coupons which were subjected to inhibited fluids.

The results are presented in the following tables. The results in Table II were obtained in the absence of oxygen by purging with $CO_2$ prior to the test. The results in Table III were obtained in the presence of oxygen by omitting the $CO_2$ purge. The tests were run in laboratory brine at a temperature of 150°F. for 72 hours. Note that the corrosion inhibitor is effective both in the presence and absence of oxygen.

Table II

| | | CO₂ Purge to Remove O₂ | | |
|---|---|---|---|---|
| Ex. | Compound | PPM | WT. LOSS | % PROTECTION |
| | Blank | | 68 | |
| | Blank | | 69 | |
| | Blank | | 67 | |
| 1 | MEP salt | | | |
| | | 200 | 15 | 78 |
| | | 500 | 26 | 61 |
| 2 | Amine C-6 1% Co++ | | | |
| | | 200 | 27 | 60 |
| | | 500 | 36 | 46 |
| 3 | Crude Picoline | | | |
| | | 200 | 12 | 82 |
| | | 500 | 23 | 66 |
| 4 | MEP + NH₄OH | | | |
| | | 200 | 21 | 69 |
| | | 500 | 54 | 19 |
| 5 | TEA | | | |
| | | 200 | 18 | 73 |
| | | 500 | 37 | 45 |

Table III

With Oxygen (NaCO₂ Purge)

| Ex. | Compound | PPM | WT. LOSS | % PROTECTION |
|-----|----------|-----|----------|--------------|
|     | Blank    |     | 38       |              |
|     | Blank    |     | 37       | 37           |
| 1   | MEP salt | 200 | 0        | 100          |
|     |          | 500 | 6        | 84           |
| 2   | Amine C-6 | 200 | 13      | 65           |
|     | 1% Co++  | 500 | 9        | 76           |
| 3   | Crude    | 200 | 7        | 81           |
|     | Picoline | 500 | 4        | 89           |
| 4   | MEP +    | 200 | 6        | 84           |
|     | NH₄OH    | 500 | 17       | 54           |
| 5   | TEA      | 200 | 11       | 70           |
|     |          | 500 | 14       | 62           |

While the specific examples of the invention have been set forth herein, it is not intended to limit the invention solely thereto, but to include all the variations and modifications falling within the spirit of the invention.

We claim:

1. A corrosion inhibiting composition comprising triethanolamine bisulfite.

2. A corrosion inhibiting composition comprising a tertinary heterocyclic amine bisulfite.

3. The bisulfite of claim 2 wherein the tertiary heterocyclic amine is selected from the group consisting of alkyl pyridines, quinoline, isoquinoline, benzoquinoline, phenanthridine, acridine; alkyl substituted quinolines, isoquinolines, benzoquinolines, phenanthridines and acridines; bis-2-(4-morpholinyl) ethyl ether, 4-(2-aminoethoxy) ethylmorpholine, 2-(4-morpholinylethoxy) ethanol, 4-(2-aminoethyl)morpholine, dimorpholinoethane and picoline.

4. The bisulfite of claim 2 where the tertiary heterocyclic amine is a pyridine amine or a morpholine amine.

5. A process of oxygen scavenging and corrosion inhibition which comprises treating a corrosive aqueous medium with the composition of claim 3.

6. A process of oxygen scavenging and corrosion inhibition which comprises treating a corrosive aqueous medium with the composition of claim 1.

7. A process of oxygen scavenging and corrosion inhibition which comprises treating a corrosive aqueous medium with the composition of claim 2.

8. A process of oxygen scavenging and corrosion inhibition which comprises treating a corrosive aqueous medium with the composition of claim 4.

9. A process of preventing corrosion of metals employed in water flooding or in the disposal of waste water and brine from oil and gas wells, which comprises injecting into an underground formation, an aqueous solution containing a minor amount of the composition of claim 1 sufficient to prevent the corrosion of said metals.

10. A process of preventing corrosion of metals employed in water flooding or in the disposal of waste water and brine from oil and gas wells, which comprises injecting into an underground formation, an aqueous solution containing a minor amount of the composition of claim 2 sufficient to prevent the corrosion of said metals.

11. A process of preventing corrosion of metals employed in water flooding or in the disposal of waste water and brine from oil and gas wells, which comprises injecting into an underground formation, an aqueous solution containing a minor amount of the composition of claim 4 sufficient to prevent the corrosion of said metals.

12. A process of preventing corrosion of metals employed in water flooding or in the disposal of waste water and brine from oil and gas wells, which comprises injecting into an underground formation, an aqueous solution containing a minor amount of the composition of claim 3 sufficient to prevent the corrosion of said metals.

13. A composition comprising the compound of claim 1 and cobalt ions.

14. A composition comprising a compound of claim 2 and cobalt ions.

15. A composition comprising a compound of claim 4 and cobalt ions.

16. A composition comprising a compound of claim 3 and cobalt ions.

* * * * *

UNITED STATES PATENT AND TRADEMARK OFFICE
CERTIFICATE OF CORRECTION

PATENT NO. : 3,976,593
DATED : August 24, 1976
INVENTOR(S) : Francis J. Hartke and James E. Davis It is certified that error appears in the above—identified patent and that said Letters Patent are hereby corrected as shown below:

In column 7, line 3, "$NaCO_2$ Purge" should read --- No $CO_2$ Purge ---

Signed and Sealed this

Thirtieth Day of November 1976

[SEAL]

Attest:

RUTH C. MASON
Attesting Officer

C. MARSHALL DANN
Commissioner of Patents and Trademarks